(12) United States Patent
Maienschein et al.

(10) Patent No.: US 8,881,622 B2
(45) Date of Patent: Nov. 11, 2014

(54) CENTRIFUGAL PENDULUM MECHANISM

(75) Inventors: Stephan Maienschein, Baden-Baden (DE); David Schnaedelbach, Buehl (DE); Darius Wysgol, Offenburg (DE); Christian Huegel, Rheinau (DE); Stefan Jung, Kehl (DE); Thorsten Krause, Buehl (DE); Eugen Kombowski, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 50 days.

(21) Appl. No.: 13/608,228

(22) Filed: Sep. 10, 2012

(65) Prior Publication Data

US 2013/0239745 A1    Sep. 19, 2013

Related U.S. Application Data

(63) Continuation of application No. PCT/DE2011/000249, filed on Mar. 7, 2011.

(30) Foreign Application Priority Data

Mar. 11, 2010  (DE) .......................... 10 2010 011 141

(51) Int. Cl.
*F16F 15/14* (2006.01)
*F16H 45/02* (2006.01)

(52) U.S. Cl.
CPC ....... *F16F 15/145* (2013.01); *F16H 2045/0263* (2013.01)
USPC .......................... 74/574.2; 74/574.4; 74/570.2

(58) Field of Classification Search
CPC . F16F 15/145; F16F 15/123; F16F 2230/007; F16F 15/1407; F16F 15/1435; F16F 15/163; F16F 15/13128; F16F 2230/0052; F16H 2045/0263; F16D 13/64; F16D 2300/22; F16D 13/58; F16D 13/644
USPC .................................. 74/574.2, 574.4, 570.2
See application file for complete search history.

(56) References Cited

U.S. PATENT DOCUMENTS 6,067,876 A * 5/2000 Lohaus .......................... 74/574.4
6,382,050 B1 * 5/2002 Carlson et al. ............... 74/570.2

(Continued)

FOREIGN PATENT DOCUMENTS

DE    19631989    9/1997
DE    19831154    1/2000

(Continued)

OTHER PUBLICATIONS

EPO Machine Translation of DE 10224874 A1, Jackel et al., Dec. 19, 2002.*

*Primary Examiner* — Vinh Luong
(74) *Attorney, Agent, or Firm* — Simpson & Simpson, PLLC

(57) ABSTRACT

A centrifugal pendulum mechanism that includes a pendulum flange and pendulum masses which are fastened on both sides of the pendulum flange by a spacing bolt accommodated in a curved cutout of the pendulum flange to form a pair of pendulum masses, where the pair of pendulum masses is guided relative to the pendulum flange by the at least two rollers and can be pivoted restrictively because of a stop, where the rollers are accommodated in curved guide tracks in the pendulum masses and in complementary curved guide tracks in the pendulum flange and can be rolled, and at least two pairs of pendulum masses are arranged so as to be circumferentially adjacent to each other.

6 Claims, 8 Drawing Sheets

(56) References Cited

U.S. PATENT DOCUMENTS

| | | | | |
|---|---|---|---|---|
| 6,450,065 B1 * | 9/2002 | Eckel et al. | ................ | 74/574.4 |
| 8,657,692 B2 * | 2/2014 | Wahl et al. | ................ | 464/68.92 |
| 2014/0026712 A1 * | 1/2014 | Movlazada | ................ | 74/574.2 |

FOREIGN PATENT DOCUMENTS

| | | | | |
|---|---|---|---|---|
| DE | 19911560 | 9/2000 | | |
| DE | 10224874 | 12/2002 | | |
| DE | 102004011830 | 9/2004 | | |
| DE | 102006028556 | 1/2007 | | |
| DE | 102006028552 | 5/2007 | | |
| DE | 102007029609 | 1/2009 | | |
| DE | 10 2010 054 302 A1 * | 6/2011 | ............ | F16F 15/14 |
| EP | 1744074 | 1/2007 | | |
| EP | 1780434 | 5/2007 | | |
| WO | WO 2011/110168 A1 * | 9/2011 | ............ | F16F 15/14 |

* cited by examiner

CENTRIFUGAL PENDULUM MECHANISM

CROSS-REFERENCE TO RELATED APPLICATIONS

This application is filed under 35 U.S.C. §120 and §365(c) as a continuation of International Patent Application PCT/DE2011/000249, filed Mar. 7, 2011, which application claims priority from German Patent Application No. 10 2010 011 141.4, filed Mar. 11, 2010, which applications are incorporated herein by reference in their entireties.

FIELD OF THE INVENTION

The invention relates to a centrifugal pendulum mechanism.

BACKGROUND OF THE INVENTION

Such centrifugal pendulum mechanisms are, for example, known as torsional vibration dampers in terms of their effect, especially when used in drivetrains of motor vehicles, for example, as disclosed in German Patent Application No. 10 2004 011 830 A1. Pendulum masses are arranged with restricted pivoting on a pendulum flange that is driven by a drive unit, such as an internal combustion engine that is subject to torsional vibrations. A quenching effect of the torsional vibration arises as a result of the pendulum motion of the pendulum masses generated by the differing angular acceleration of the pendulum flange.

The pendulum flange can, for example, be designed to be integral with a component of a torsional vibration damper or a dual-mass flywheel, or it can be arranged on one of these components. Pendulum masses can be arranged on both sides of the pendulum flange, where axially opposing pendulum masses are connected to each other by means of spacing bolts. The spacing bolts move in cutouts that have a shape which is adapted to the pendulum motion of the pendulum masses. The pendulum masses are guided on the pendulum flange by means of guide tracks introduced there, for example, in the form of curved through-holes that are formed to be complementary with the guide tracks in the pendulum flange, where rolling elements roll in the guide tracks. The pendulum masses can be pivoted relative to the pendulum flange to a limited extent due to a stop. Depending on the nature of the pendulum mass deflection, the stops are formed by the spacing bolts impacting within the respective cutouts, or by circumferentially adjacent pendulum masses impacting each other.

While the centrifugal pendulum mechanism is operating or, for example, as the pendulum flange transitions from rotating to resting, the pendulum masses can impact each other or impact the spacing bolts in the cutout, which can lead to annoying noises in the centrifugal pendulum mechanism.

BRIEF SUMMARY OF THE INVENTION

The object of the invention is to improve the noise quality of a centrifugal pendulum mechanism while simultaneously optimizing the use of the installation space.

A centrifugal pendulum mechanism is correspondingly proposed that includes a pendulum flange and pendulum masses, which are fastened on both sides of the pendulum flange by means of a spacing bolt accommodated in a curved cutout of the pendulum flange to form a pair of pendulum masses, where the pair of pendulum masses is guided relative to the pendulum flange by means of at least two rollers and can be pivoted restrictively because of a stop, where the rollers are accommodated in curved guide tracks in the pendulum masses and in complementary curved guide tracks in the pendulum flange and can be rolled, and at least two pairs of pendulum masses are arranged so as to be circumferentially adjacent to each other. The stop for limiting the movement of the pair of pendulum masses is formed by the spacing bolt impacting the respective cutout, or by the impact of respective side surfaces of circumferentially neighboring pairs of pendulum masses, where damping means are formed on one of the components forming the stop. This dampens the impact and therefore reduces noise.

The impact of circumferentially neighboring pendulum masses can preferably be dampened by the previously acting impact of at least one roller in the guide path accommodating the roller. For example, overload protection is achieved for the damping means forming the stop for circumferentially neighboring pendulum masses, thus allowing the damping means to possess greater reliability and/or durability.

In one embodiment of the invention, the damping means, especially the damping means introduced on the stop between the spacing bolt and its cutout, or between circumferentially neighboring side surfaces of two pendulum masses, is designed as a composite element, at least including a first annular sub-element with elastic material properties, and a second also annular sub-element that preferably concentrically surrounds it, such as a sleeve, having material with high strength and/or rigidity in comparison to the first sub-element that is, for example, made of metal.

The composite element can be preferably designed such that the first sub-element is placed loosely on a spacing bolt, and the second sub-element is placed loosely on a spacing bolt.

In another embodiment of the invention, either the first sub-element can be integrally bonded, for example, by adhesion or vulcanization, to the second sub-element, or the first sub-element can be keyed to a spacing bolt. Additionally or alternatively, at least two components of the composite element are joined under initial tension.

The first sub-element of the composite element can also fill just part of the space between the spacing bolt and second sub-element so that the first sub-element can escape under an arising load, for example under impact.

The first sub-element and/or the second sub-element can also be designed from several parts.

The centrifugal pendulum mechanism can be arranged on a torsional vibration damper within a converter housing of a hydrodynamic torque converter, on a clutch device, such as a wet clutch or a dual clutch, or on a dual-mass flywheel.

In one embodiment of the invention, the damping means are integrally bonded or keyed with a component forming the stop. The damping means can be a damping layer that, for example, is glued to the respective component in the area of the stop or connected in some other manner. For example, the damping means can be clamped or caulked to the respective component.

In another embodiment of the invention, the damping means are attached to the axial section of the spacing bolt extending through the cutout.

In another embodiment of the invention, the damping means are attached to the surface of the edge of the cutout. The damping means are preferably attached to a peripheral or radial end area of the edge surface of the cutout. The damping means can also be attached in both peripheral end areas of the edge surface of the cutout.

In another embodiment of the invention, the damping means are arranged on the side surface of a pendulum mass that directly neighbors the circumferentially neighboring pendulum mass.

In another embodiment of the invention, the damping means are designed as elastic means, for example, as an elastomer, or thermoplastic, or plastic, or another material that is more elastic than steel.

In another embodiment of the invention, the damping means are designed as a single part with the component forming the stop.

Additional advantages and advantageous embodiments of the invention are found in the description and figures that, for the sake of clarity, are not reproduced true to scale. All of the explained features can be used in the indicated combination as well as in other combinations or by themselves without departing from the scope of the invention.

BRIEF DESCRIPTION OF THE SEVERAL VIEWS OF THE DRAWING

The nature and mode of operation of the present invention will now be more fully described in the following detailed description of the invention taken with the accompanying drawing figures, in which:

FIG. 2b is a three-dimensional detailed view of section A of FIG. 2a;

FIG. 3b is a three-dimensional detailed view of section B from FIG. 3a;

FIG. 4b is a three-dimensional detailed view of section C of FIG. 4a;

FIG. 5b is a cross-sectional view of the damping means of FIG. 5a;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
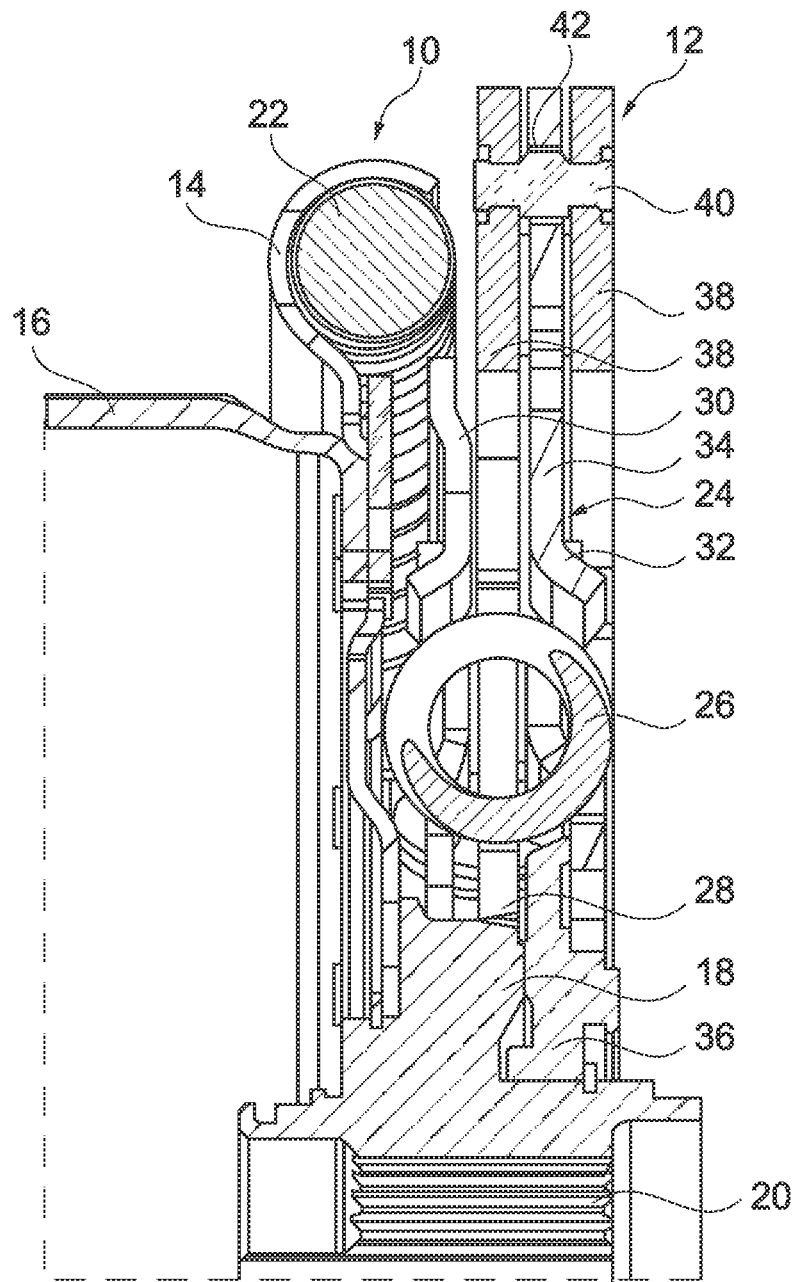
FIG. 1 is a side view of a torsional vibration damper with a centrifugal pendulum mechanism arranged thereupon in an embodiment of the invention.

FIG. 1 shows a side view of torsional vibration damper 10 with centrifugal pendulum mechanism 12 arranged thereupon. Disc carrier 16 functioning as a clutch output of a clutch device is arranged on damper part 14 of torsional vibration damper 10 designed as a parallel damper. The clutch device can, for example, be designed as a torque converter lockup clutch or as a wet clutch. Torsional vibration damper 10 is effectively connected between the clutch output and drive hub 18, where drive hub 18 can be connected via teeth 20 to a transmission input shaft of a transmission in a drivetrain of a motor vehicle.

Damper input part 14 is centered radially to the inside on drive hub 18, and is accommodated in an axially secure manner, and surrounds first energy storage elements 22 radially to the outside such as bow springs that effectively connect damper input part 14 to intermediate damper part 24, where intermediate damper part 24 is slightly rotatable relative to damper input part 14. Intermediate damper part 24 in turn is slightly rotatable relative to damper output part 28 under the effect of second energy storage elements 26 such as pressure springs that lie radially further to the inside. Damper output part 28 is non-rotatably connected to drive hub 18, for example, by means of a weld connection.

Intermediate damper part 24 includes of two axially spaced disc parts 30, 32 that axially enclose damper output part 28. One disc part 32 is extended radially to the outside to form pendulum flange 34. Pendulum flange 34 is an integral component of disc part 32, but it can also be fastened as a separate component thereto, for example, by being riveted, screwed or welded. Disc part 32 is non-rotatably connected radially inside with turbine hub 36, and turbine hub 36 is used to connect a turbine wheel of a hydrodynamic torque converter. Turbine hub 36 is centered on drive hub 18 and is rotatably arranged relative thereto.

Pendulum flange 34 accommodates two axially opposing pendulum masses 38 in a section radially to the outside, where pendulum masses 38 are connected to each other by means of spacing bolt 40, and spacing bolt 40 extends through section 42 in pendulum flange 34.

Figure 2A:
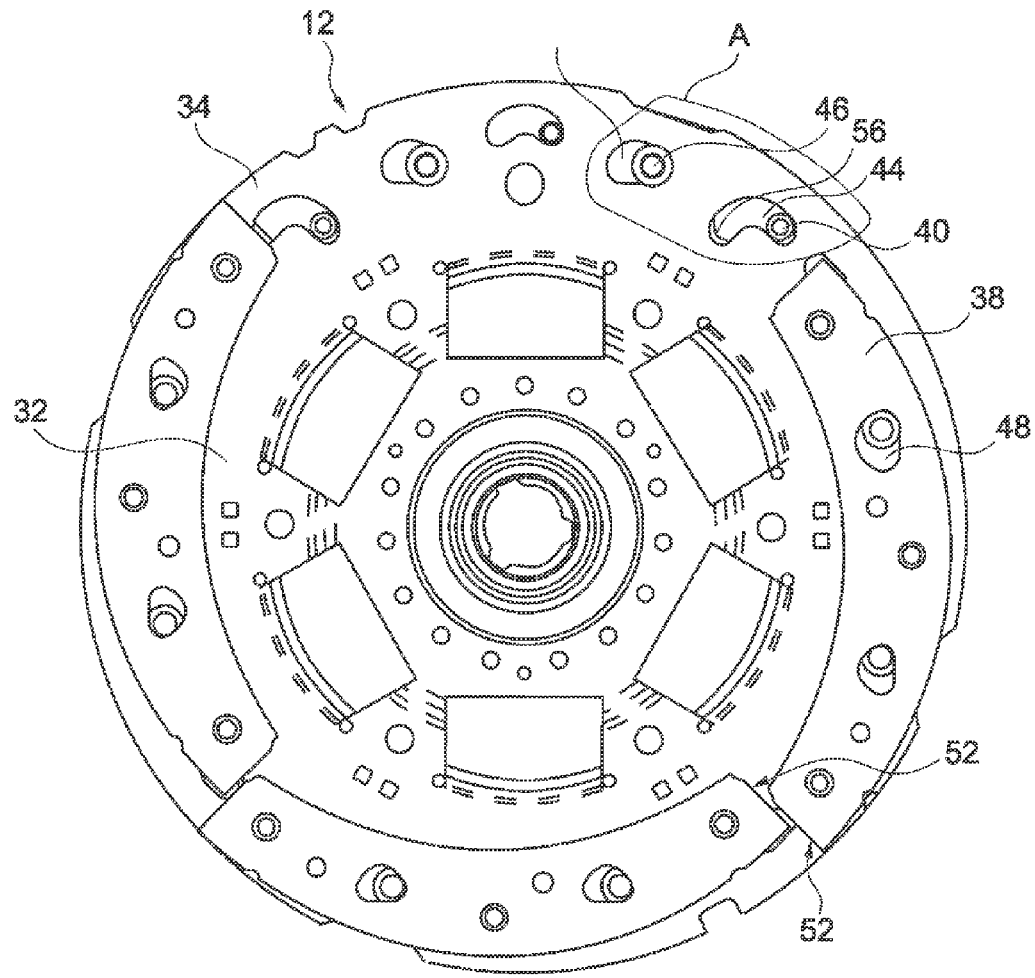
FIG. 2a is a side view of a centrifugal pendulum mechanism in an embodiment of the invention.

FIG. 2a shows a side view of centrifugal pendulum mechanism 12 in an embodiment of the invention, where the top pendulum mass was left out of the drawing to illustrate the area underneath. Centrifugal pendulum mechanism 12 is arranged on disc part 32 of the intermediate damper part of the torsional vibration damper, where the radial extension of disc part 32 forms pendulum flange 34 for accommodating pendulum masses 38 arranged on both sides of pendulum flange 34, where two pendulum masses 38 each are arranged axially on both sides of pendulum flange 34 and are connected to each other by means of spacing bolts 40 to a pair of pendulum masses. Spacing bolts 40 extend through sections 44 in pendulum flange 34, where the sections 44 are designed in the shape of an arc such that they enable a pendulum movement of pendulum masses 38 relative to pendulum flange 34 along their pendulum path. Pendulum masses 38 are guided over rollers 46 on pendulum flange 34, and rollers 46 can roll in kidney-shaped guide paths 48 on pendulum masses 38 and in complementary kidney-shaped guide paths 50 on pendulum flange 34.

Figure 2B:
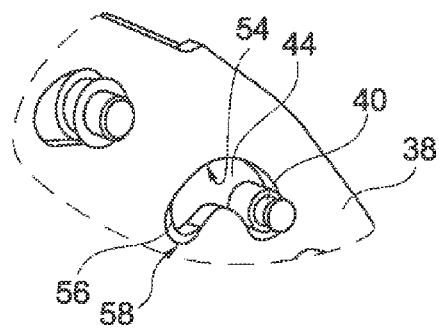

The movement of pendulum masses 38 relative to pendulum flange 34 is limited by stops, where the stops, depending on the nature of the deflection of pendulum mass 38, are formed by the impact of spacing bolts 40 in respective cutouts 44, or by the impact of respective side surfaces 52 of circumferentially neighboring pendulum masses 38 against each other. FIG. 2b shows section A of FIG. 2a in a three-dimensional view. In cutouts 44, that is, on edge surface 54 of cutouts 44, damping means 56 are attached in the form of a damping layer which, for example, can be integrally bonded or keyed to edge surface 54. Preferably, damping means 56 are attached in a circumferential or radial end area 58 of edge surface 54, ideally where spacing bolts 40 can strike edge surface 54 instead of gliding along it.

Figure 3A:
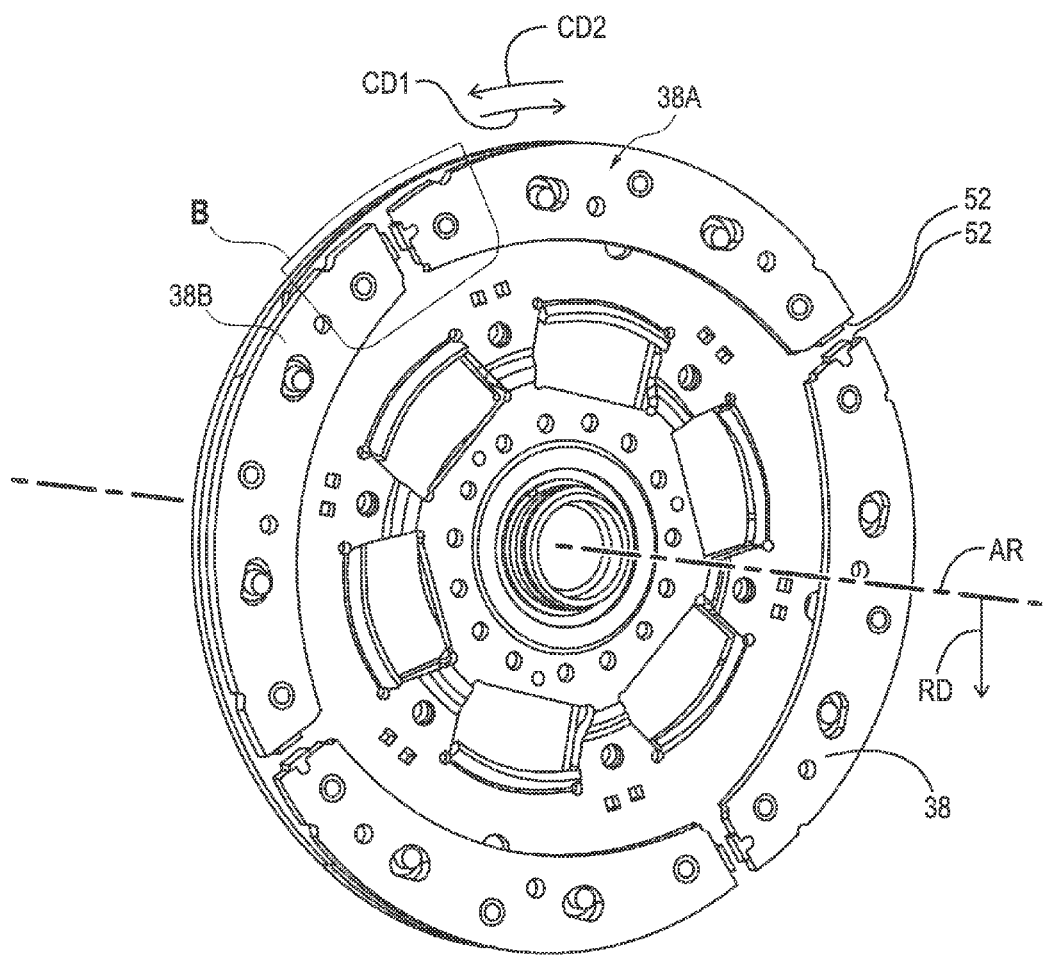
FIG. 3a is a side view of a centrifugal pendulum mechanism in another embodiment of the invention.
Figure 3B:
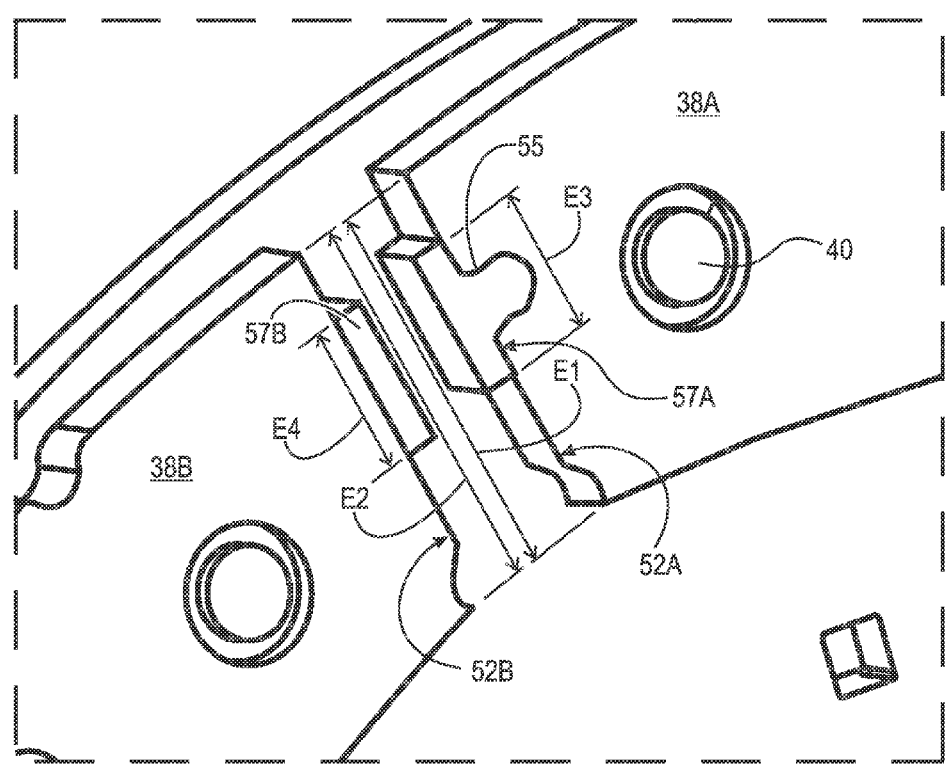

FIG. 3a shows a side view of centrifugal pendulum mechanism 12 in another embodiment of the invention, where the top pendulum mass was left out of the drawing to illustrate the area underneath. As shown in FIG. 3b in greater detail with reference to three-dimensional section B of FIG. 3a: pendulum 38A includes side surface 52A; pendulum 38B includes side surface 52B facing side surface 52A in circumferential direction CD1; side surface 52A includes indentation 55 forming a keyed fit in side surface 52A; buffer element 57A is disposed in indentation 55 and extends from side surface 52A in circumferential direction CD2; buffer element 57B extends from side surface 52B in circumferential direction CD1; side surfaces 52A and 52B have extents E1 and E2, respectively in radial direction RD orthogonal to axis of rotation AR for mechanism 12; buffer elements 57A and 57B have extents E3 and E4, respectively, in direction RD; extent E1 is greater than extent E3; and extent E2 is greater than extent E4.

Figure 4A:
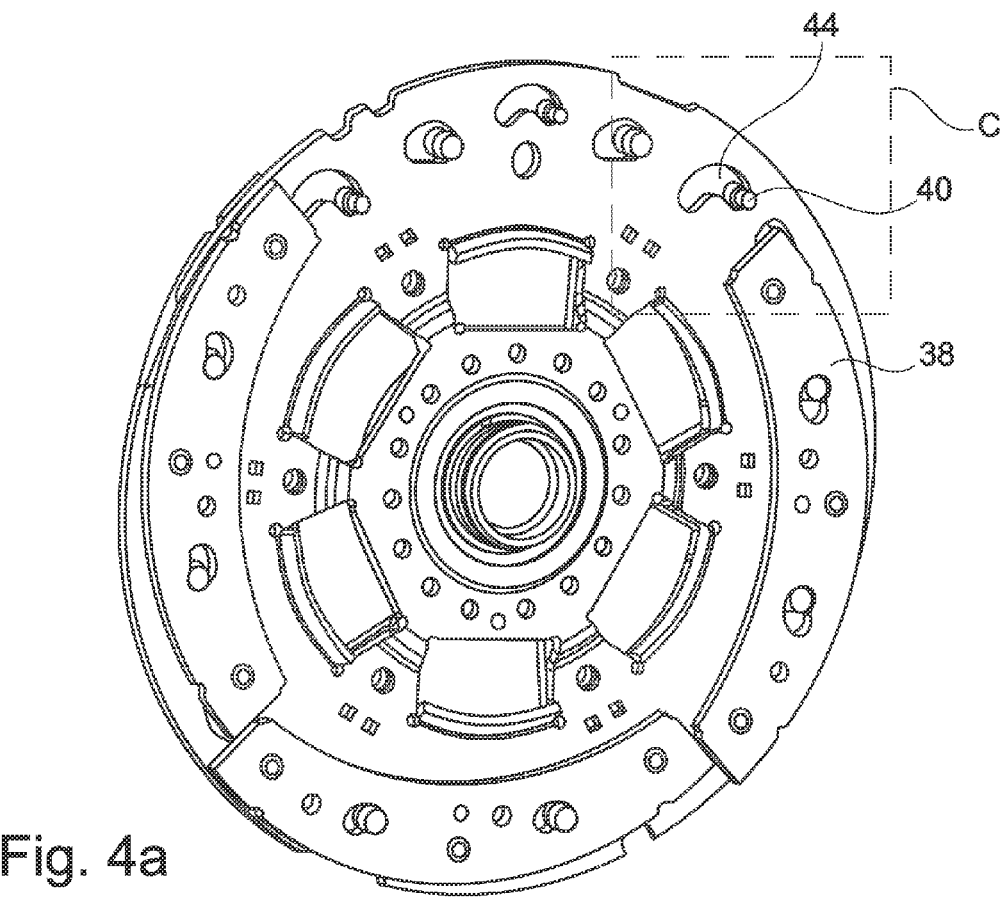
FIG. 4a is a side view of a centrifugal pendulum mechanism in another embodiment of the invention.
Figure 4B:
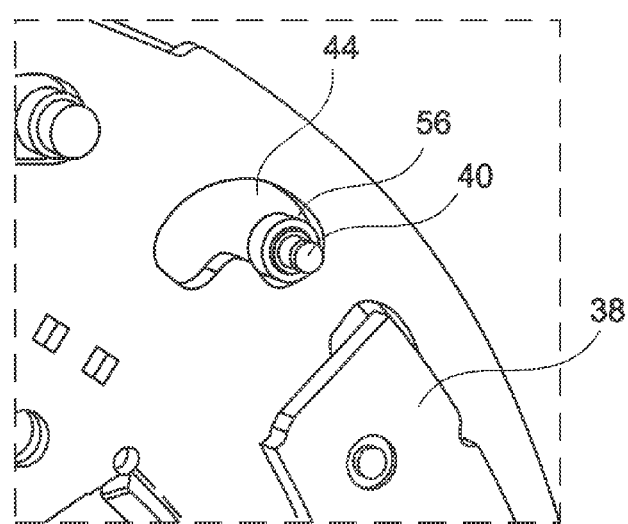

FIG. 4a shows a side view of centrifugal pendulum mechanism 12 in another embodiment of the invention. FIG. 4b shows the three-dimensional view of section C of FIG. 4a. Spacing bolts 40 have damping means 56 in the form of a damping sleeve on their rolling surface which can dampen the impact of spacing bolts 40 in cutouts 44.

Figure 5A:
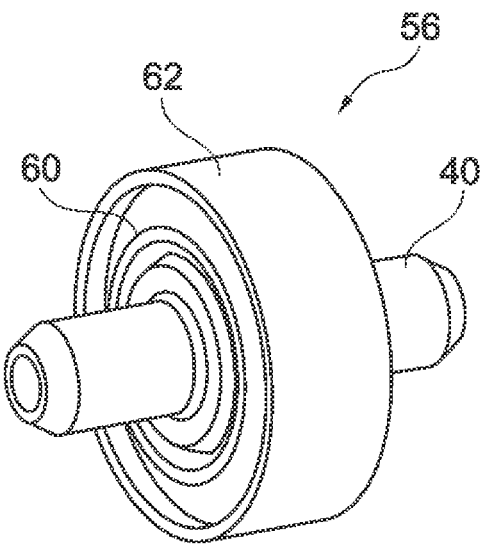
FIG. 5a is a three-dimensional view of damping means in an embodiment of the invention.
Figure 5B:
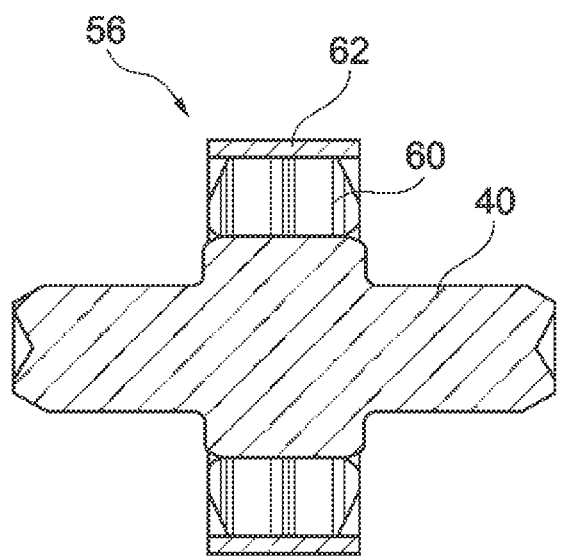

Damping means 56 are shown in FIG. 5a and FIG. 5b in an embodiment of the invention. Damping means 56 are attached to spacing bolt 40, for example, in a keyed fit, or also with a certain amount of play between damping means 56 and spacing bolt 40. Furthermore, damping means 56 are designed as a composite element consisting of first, annular sub-element 60 preferably with elastic material properties, and a second also annular sub-element 62 that preferably concentrically surrounds it, such as a sleeve, especially having a material with greater strength and/or rigidity in comparison to first sub-element 60. Second sub-element 62 can, for example, be made of metal.

Figure 6:
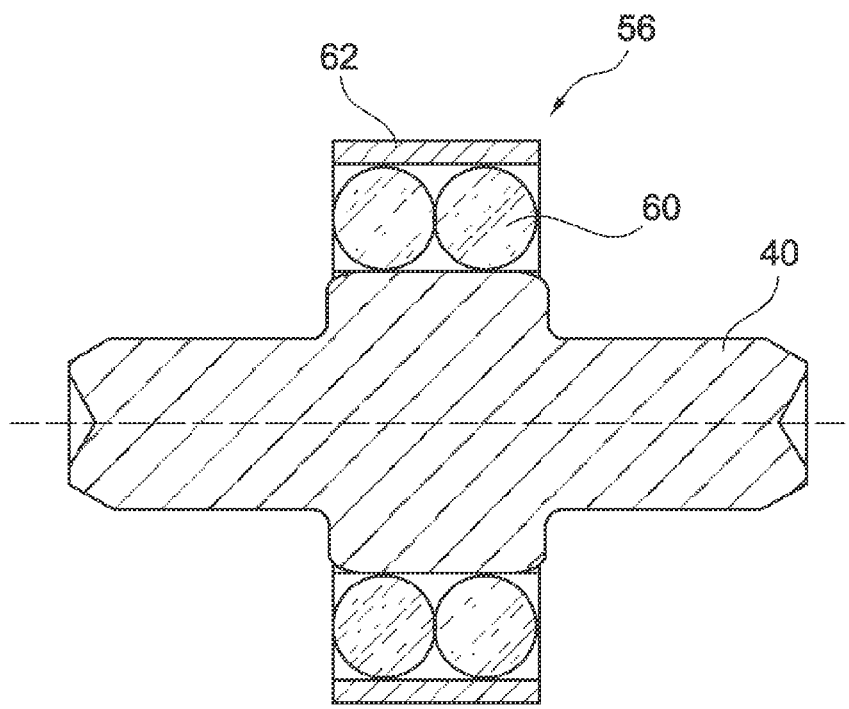
FIG. 6 is a cross-sectional view of damping means in another embodiment of the invention; and, FIG. 7 is a partial section of a side view of a centrifugal pendulum mechanism in another embodiment of the invention.

FIG. 6 shows a cross-sectional view of damping means 56 in another embodiment of the invention. The damping means are designed as a composite element consisting of first sub-element 60 and second sub-element 62, where first sub-element 60 is designed as a toroidal element, such as a sealing ring, and preferably as an O-ring. First sub-element 60 is designed to be more elastic than second sub-element 62 and also not as rigid and/or strong.

Figure 7:
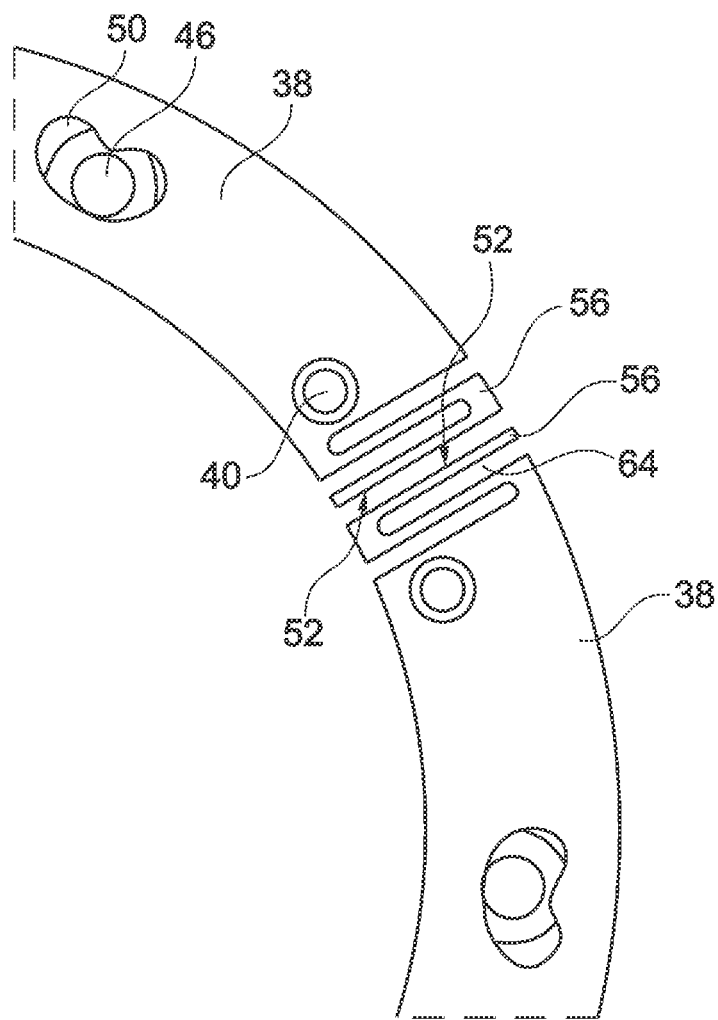

FIG. 7 shows a section of a side view of centrifugal pendulum mechanism 12 in another embodiment of the invention. Damping means 56 are formed on side surfaces 52 of circumferentially neighboring pendulum masses 38 as a single part with respective pendulum mass 38. Cutouts 64 or slots extending radially are introduced in pendulum mass 38 to give pendulum mass 38 elastic material properties to form damping means 56.

In one embodiment, two radially extending cutouts 64 are provided; however, a plurality of cutouts can be formed that can not only extend radially but can also alternatively or additionally have windings and be designed in a serpentine fashion. The cutouts can also be designed to run axially and/or radially and/or have a combination of a radial and an axial path. The cutouts can preferably be created by stamping and/or cutting, such as laser cutting.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

10 Torsional vibration damper
12 Centrifugal pendulum mechanism
14 Damper input part
16 Disc carrier
18 Drive hub
20 Gearing
22 Energy storage element
24 Intermediate damper part
26 Energy storage element
28 Damper output part
30 Disc part
32 Disc part
34 Pendulum flange
36 Turbine hub
38 Pendulum mass
40 Spacing bolts
42 Cut out
44 Cut out
46 Rollers
48 Guide path
50 Guide path
52 Side surface
54 Edge surface
55 Indentation
56 Damping means
57 Buffer element
58 End area
60 Sub-element
62 Sub-element
64 Cut out

What is claimed is:

1. A centrifugal pendulum mechanism, comprising:
  a pendulum flange including a plurality of first curved guide cutouts and a plurality of second curved guide cutouts;
  a first pendulum mass including:
    third and fourth curved guide cutouts; and,
    a first side surface including:
      a first indentation forming a keyed fit in the first side surface; and,
      a first extent in a radial direction orthogonal to an axis of rotation for the mechanism;
  a second pendulum mass including:
    fifth and sixth curved guide cutouts; and,
    a second side surface:
      facing the first side surface in a first circumferential direction; and,
      including a second extent in the radial direction;

a plurality of spacing bolts disposed in the plurality of first curved guide cutouts;
first and second rollers accommodated in the third and fourth curved guide cutouts, rollable in the third and fourth curved guide cutouts, and accommodated in respective second curved guide cutouts;
third and fourth rollers accommodated in the fifth and sixth curved guide cutouts, rollable in the fifth and sixth curved guide cutouts, and accommodated in respective second curved guide cutouts;
a first damping element disposed in the keyed fit for the first pendulum mass, extending from the first side surface in a second circumferential direction, opposite the first circumferential direction, and having a third extent in the radial direction; and,
a second damping element extending from the second side surface in the first circumferential direction and having a fourth extent in the radial direction, wherein:
the first pendulum mass is guided relative to the flange by the first and second rollers;
the second pendulum mass is guided relative to the flange by the third and fourth rollers;
the first extent is greater than the third extent; and,
the second extent is greater than the fourth extent.

2. The centrifugal pendulum mechanism as recited in claim 1, wherein the first and second damping elements are integrally bonded or keyed to the first and second pendulum masses, respectively.

3. A mechanism, comprising:
a vibration damper including:
   at least one disc part arranged to receive torque;
   a damper output part; and,
   at least one energy storage element engaged with the at least one disc part and the damper output part;
a pendulum flange non-rotatably connected to the at least one disc part and including a plurality of first curved guide cutouts and a plurality of second curved guide cutouts;
a first pendulum mass including:
   third and fourth curved guide cutouts; and,
   a first side surface including:
      a first indentation forming a keyed fit in the first side surface; and,
      a first extent in a radial direction orthogonal to an axis of rotation for the mechanism;
a second pendulum mass including:
   fifth and sixth curved guide cutouts; and,
   a second side surface:
      facing the first side surface in a first circumferential direction; and,
      including a second extent in the radial direction;
a plurality of spacing bolts disposed in the plurality of first curved guide cutouts;
first and second rollers accommodated in the third and fourth curved guide cutouts, rollable in the third and fourth curved guide cutouts, and accommodated in respective second curved guide cutouts;
third and fourth rollers accommodated in the fifth and sixth curved guide cutouts, rollable in the fifth and sixth curved guide cutouts, and accommodated in respective second curved guide cutouts;
a first damping element disposed in the keyed fit for the first pendulum mass, extending from the first side surface in a second circumferential direction, opposite the first circumferential direction, and having a third extent in the radial direction; and,
a second damping element extending from the second side surface in the first circumferential direction and having a fourth extent in the radial direction, wherein:
the first pendulum mass is guided relative to the flange by the first and second rollers;
the second pendulum mass is guided relative to the flange by the third and fourth rollers;
the first extent is greater than the third extent; and,
the second extent is greater than the fourth extent.

4. A mechanism, comprising:
a vibration damper including:
   a disc carrier arranged to receive torque;
   at least one disc part arranged to transmit the torque;
   at least one first energy storage element engaged with the disc carrier and the at least one disc part;
   a damper output part; and,
   at least one second energy storage element engaged with the at least one disc part and the damper output part; and,
a pendulum mechanism including:
a pendulum flange non-rotatably connected to the at least one disc part and including a plurality of first curved guide cutouts and a plurality of second curved guide cutouts;
a first pendulum mass including:
   third and fourth curved guide cutouts; and,
   a first side surface including:
      a first indentation forming a keyed fit in the first side surface; and,
      a first extent in a radial direction orthogonal to an axis of rotation for the mechanism;
a second pendulum mass including:
   fifth and sixth curved guide cutouts; and,
   a second side surface:
      facing the first side surface in a first circumferential direction; and,
      including a second extent in the radial direction;
a plurality of spacing bolts disposed in the plurality of first curved guide cutouts;
first and second rollers accommodated in the third and fourth curved guide cutouts, rollable in the third and fourth curved guide cutouts, and accommodated in respective second curved guide cutouts;
third and fourth rollers accommodated in the fifth and sixth curved guide cutouts, rollable in the fifth and sixth curved guide cutouts, and accommodated in respective second curved guide cutouts;
a first damping element disposed in the keyed fit for the first pendulum mass, extending from the first side surface in a second circumferential direction, opposite the first circumferential direction, and having a third extent in the radial direction; and,
a second damping element extending from the second side surface in the first circumferential direction and having a fourth extent in the radial direction, wherein:
the first pendulum mass is guided relative to the flange by the first and second rollers;
the second pendulum mass is guided relative to the flange by the third and fourth rollers;
the first extent is greater than the third extent; and,
the second extent is greater than the fourth extent.

5. The mechanism of claim 4, wherein at least a portion the at least one first energy storage element is aligned with the first and second pendulum masses in an direction parallel to an axis of rotation for the mechanism.

6. The mechanism of claim 4, wherein the at least one first energy storage element is radially outward of the at least one second energy storage element.

\* \* \* \* \*